US010303732B2

(12) United States Patent
Lieb

(10) Patent No.: US 10,303,732 B2
(45) **Date of Patent: *May 28, 2019**

(54) CONTEXTUAL QUICK-PICKS

(71) Applicant: Excalibur IP, LLC, Sunnyvale, CA (US)

(72) Inventor: Kirk Lieb, Cupertino, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,971

(22) Filed: Jul. 14, 2017

(65) Prior Publication Data

US 2017/0316104 A1 Nov. 2, 2017

Related U.S. Application Data

(63) Continuation of application No. 12/897,642, filed on Oct. 4, 2010, now Pat. No. 9,779,168.

(51) Int. Cl.

*G06F 16/00* (2019.01)
*G06F 16/9535* (2019.01)

(52) U.S. Cl.

CPC ................................ *G06F 16/9535* (2019.01)

(58) Field of Classification Search

None

See application file for complete search history.

(56) References Cited

U.S. PATENT DOCUMENTS 5,048,099 A 9/1991 Lee
5,070,478 A 12/1991 Abbott
5,517,586 A 5/1996 Knowlton
5,574,840 A 11/1996 Kwatinetz et al.
5,619,709 A 4/1997 Caid et al.

(Continued)

FOREIGN PATENT DOCUMENTS

WO WO 01/11504 2/2001
WO WO 2004/114163 A2 12/2004
WO WO 2005/050491 A1 6/2005

OTHER PUBLICATIONS

All Your Words.com, "All Your Words.com" AllYourWords 1.0 Search Engine, 2005, locate on the internet at < http://allyourwords.com/> , retrieved on Dec. 14, 2005 (1 page).

(Continued)

*Primary Examiner* — Son T Hoang

(74) *Attorney, Agent, or Firm* — Hickman Palermo Becker Bingham LLP; Edward A. Becker

(57) ABSTRACT

Formulation of queries by providing quick-picks to the user is based, at least in part, on the context in which the query is being formulated. Quick-picks are items that, when selected, add search criteria items to a query that is being formed. The quick picks that are presented to the user are selected based on the context in which the search is being performed. For example, a user may be presented with (a) a search box for entering keywords for a search, and (b) selectable words extracted from or otherwise related to the content currently being displayed on the device that is being used to formulate the search query. When the user selects one of the selectable words, the selected word is inserted into the search box, thereby obviating the need to separately enter each character of the word.

17 Claims, 2 Drawing Sheets

100

USER VISIBLE
118 SEARCH RESULTS
110 QUERY INPUT CONTROL
108 QUICK-PICKS
112 CONTEXT
116 QUERY
120 QUERY AUGMENTER MODULE
106 QUICK-PICK PRESENTATION MODULE
102 CONTEXT ANALYSIS MODULE
104 QUICK-PICK SELECTION MODULE
114 SEARCH ENGINE

(56) References Cited

U.S. PATENT DOCUMENTS 5,712,656 A 1/1998 Ikeda et al.
5,714,983 A 2/1998 Sacks
5,734,887 A 3/1998 Kingberg et al.
5,771,378 A 6/1998 Holt et al.
5,822,539 A 10/1998 van Hoff
5,835,087 A 11/1998 Herz et al.
5,895,470 A 4/1999 Pirolli et al.
6,018,738 A 1/2000 Breese et al.
6,049,776 A 4/2000 Donnelly et al.
6,064,979 A 5/2000 Perkowski
6,134,532 A 10/2000 Lazarus et al.
6,169,992 B1 1/2001 Beall et al.
6,240,430 B1 5/2001 Deike et al.
6,249,740 B1 6/2001 Ito et al.
6,327,590 B1 12/2001 Chidlovskii et al.
6,345,289 B1 2/2002 Lotspiech et al.
6,349,299 B1 2/2002 Spencer et al.
6,356,922 B1 3/2002 Schilit et al.
6,385,351 B1 5/2002 Simske et al.
6,446,065 B1 9/2002 Nishioka et al.
6,460,036 B1 10/2002 Herz
6,490,579 B1 12/2002 Gao et al.
6,564,209 B1 5/2003 Dempski et al.
6,605,120 B1 8/2003 Fields et al.
6,633,868 B1 10/2003 Min et al.
6,640,010 B2 10/2003 Seeger et al.
6,671,683 B2 12/2003 Kanno
6,683,631 B2 1/2004 Carroll
6,701,311 B2 3/2004 Biebesheimer et al.
6,751,780 B1 6/2004 Neff et al.
6,785,670 B1 8/2004 Chiang et al.
6,785,671 B1 8/2004 Bailey et al.
6,789,073 B1 9/2004 Lunenfeld
6,804,659 B1 10/2004 Graham et al.
6,816,857 B1 11/2004 Weissman et al.
6,853,998 B2 2/2005 Biebesheimer et al.
6,859,807 B1 2/2005 Knight et al.
6,891,551 B2 5/2005 Keely et al.
6,891,635 B2 5/2005 Dutta
6,931,397 B1 8/2005 Sundaresan
6,947,930 B2 9/2005 Anick et al.
6,961,731 B2 11/2005 Holbrook
7,007,074 B2 2/2006 Radwin
7,028,024 B1 4/2006 Kommers et al.
7,058,626 B1 6/2006 Pan et al.
7,137,077 B2 11/2006 Iwema et al.
7,139,445 B2 11/2006 Pilu et al.
7,200,638 B2 4/2007 Lake
7,243,095 B2 7/2007 Chang et al.
7,284,192 B2 10/2007 Kashi et al.
7,299,424 B2 11/2007 Jarrett et al.
7,409,402 B1 8/2008 Chan et al.
7,421,426 B2 9/2008 Berstis et al.
7,467,349 B1 12/2008 Bryar et al.
7,702,677 B2 4/2010 Chang et al.
8,838,562 B1 9/2014 Boyen
2001/0037205 A1 11/2001 Joao
2002/0004735 A1 1/2002 Gross
2002/0072997 A1 6/2002 Colson et al.
2002/0078029 A1 6/2002 Pachet
2002/0081020 A1 6/2002 Shimazu
2002/0092019 A1 7/2002 Marcus
2002/0103798 A1 8/2002 Abrol et al.
2002/0105532 A1 8/2002 Oblinger
2002/0124623 A1 9/2002 Yokomizo
2002/0152222 A1 10/2002 Holbrook
2002/0194070 A1 12/2002 Totham et al.
2003/0051214 A1 3/2003 Graham et al.
2003/0061200 A1 3/2003 Hubert et al.
2003/0074369 A1 4/2003 Schuetze et al.
2003/0097357 A1 5/2003 Ferrari et al.
2003/0135582 A1 7/2003 Lee et al.
2003/0177059 A1 9/2003 Smorenburg et al.
2003/0204530 A1 10/2003 Anderson et al.
2003/0229893 A1 12/2003 Sgaraglino
2003/0233224 A1 12/2003 Marchisio et al.
2004/0002959 A1 1/2004 Alpert et al.
2004/0054627 A1 3/2004 Rutledge
2004/0100510 A1 5/2004 Milic-Frayling et al.
2004/0117358 A1 6/2004 Von Kaenel et al.
2004/0133471 A1 7/2004 Pisaris-Henderson et al.
2004/0158852 A1 8/2004 Wysocki
2004/0193520 A1 9/2004 LaComb et al.
2004/0199496 A1 10/2004 Liu et al.
2004/0210468 A1 10/2004 Rubel et al.
2004/0240735 A1 12/2004 Medina
2005/0060311 A1 3/2005 Tong et al.
2005/0080780 A1 4/2005 Colledge et al.
2005/0102177 A1 5/2005 Takayama
2005/0125354 A1 6/2005 Pisaris-Henderson et al.
2005/0131894 A1 6/2005 Vuong
2005/0149496 A1 7/2005 Mukherjee et al.
2005/0160080 A1 7/2005 Dawson
2005/0165642 A1 7/2005 Brouze et al.
2005/0228787 A1 10/2005 Linden et al.
2005/0257045 A1 11/2005 Bushman et al.
2006/0026013 A1* 2/2006 Kraft ................. G06F 17/30867 705/1.1
2006/0036490 A1 2/2006 Sagalyn
2006/0036570 A1 2/2006 Schaefer et al.
2006/0069610 A1 3/2006 Rossini
2006/0074726 A1 4/2006 Forbes et al.
2006/0074853 A1 4/2006 Liu et al.
2006/0074876 A1 4/2006 Kakivaya et al.
2006/0116926 A1 6/2006 Chen
2006/0149710 A1 7/2006 Koningstein et al.
2006/0156222 A1 7/2006 Chi et al.
2006/0195382 A1 8/2006 Sung
2006/0230415 A1 10/2006 Roeding
2006/0242018 A1 10/2006 Shulman et al.
2007/0043612 A1 2/2007 Koplovitz et al.
2007/0083429 A1 4/2007 Kraft
2007/0106657 A1 5/2007 Brzeski et al.
2007/0150466 A1 6/2007 Brave et al.
2007/0168346 A1 7/2007 Markanthony et al.
2007/0203820 A1 8/2007 Rashid
2007/0220520 A1 9/2007 Tajima
2007/0260448 A1 11/2007 Lorenzen et al.
2007/0282797 A1 12/2007 Wang et al.
2007/0282813 A1 12/2007 Cao et al.
2008/0313119 A1 12/2008 Leskovec et al.
2009/0019002 A1 1/2009 Boulis
2009/0112857 A1 4/2009 Tong et al.
2009/0125544 A1 5/2009 Brindley
2009/0193352 A1* 7/2009 Bunn ................ G06F 17/30873 715/780
2009/0265338 A1 10/2009 Kraft et al.
2010/0070484 A1 3/2010 Kraft et al.
2010/0083105 A1 4/2010 Channabasavaiah
2010/0205202 A1* 8/2010 Yang ................. G06F 17/30277 707/767
2011/0289066 A1* 11/2011 Jaffe ................. G06F 17/30864 707/706

OTHER PUBLICATIONS

Almieda, B. et al., "A Community-Aware Search Engine" *Department of Computer Science*, WWW2004, May 17-22, 2004. pp. 413-421.

Bharat, K. "SearchPad: explicit capture of search context to support Web search," Proceedings 9$^{th}$ International World Wide Web Conference May 15-19, 2000. pp. 493-501.

Bharat, K., "SearchPad: Explicit Capture of Search Context to Support Web Search," Compaq, Systems Research Center, retrieved from website http://www9.org/w9cdrom/173/173.html>, printed on Apr. 12, 2007, 13 pages.

Budzik, J. et al., "Anticipating Information Needs: Everyday Applications as Interfaces to Internet Information Resources," in Proceedings of the 1998 World Conference of the WWW, Internet and Intranet, (Orlando, FL), AACE Press, 1998. 8 pages.

Budzik, J. et al., "Information Access in Context," Knowledge Based Systems, 14 (1-2), 37-53, Sep. 30, 2001. 17 pages.

(56) References Cited

OTHER PUBLICATIONS

Budzik, J. et al., "Supporting on-line resource discovery in the context of ongoing tasks with proactive software assistants," International Journal of Human-Computer Studies, 56, 47-74, Jan. 2002, 28 pages.
Budzik, J. et al., (1999), "Watson: Anticipating and Contextualizing Information Needs". In Proceedings of the Sixty-Second Annual Meeting of the American Society for Information Science (Oct. 31, Nov. 4, 1999), Learned Information, Inc., Medford, N.J. 1999 (14 pages).
Budzik, J. et al., "User Interactions with Everyday Applications as Context for Just-in-time Information Access," Proceedings of the 2000 International Conference on Intelligent User Interfaces, ACM Press 2000 (8 pages).
Chinese Office Action received in application Serial No. 200680037856.X dated Sep. 7, 2010 (8 pages).
Current Claims of Chinese application serial No. 200680037856.X, Dec. 2010 (5 pages).
Chinese Office Action received in Application serial No. 200580032112.4 dated Oct. 28, 2010 (27 pages).
Current Claims in Application serial No. 200580032112.4, Dec. 2010 (5 pages).
Dumais, S. et al., "Optimizing Search by Showing Results in Context," Mar. 31, 2001, ACM, pp. 1-8.
European Patent Office, "Supplementary European Search Report," application No. EP 05774749, dated Mar. 31, 2009 (7 pages).
Claims, application No. EP 05774749, 9 pages.
Fagin, R., "Searching the Workplace Web," May 20-24, 2003, WWW2003 Budapest, Hungary (10 pages).
Finkelstein, L. et al., "Placing Search in Context: The Concept Revisited," WWW10, May 2-5, 2001. 13 pages.
D1: Finkelstein, L. et al., "Placing Search in Context: The Concept Revisited" 2002 ACM (18 pages).
Freyne, J. et al., "Further Experiments on Collaborative Ranking in Community-Based Web Search," *Artificial Intelligence Review* 2004. pp. 229-252.
Gibbins, N. et al., "Agent-based Semantic Web Services," International World wide web conference, Proceedings of the 12$^{th}$ International conference World wide web, ACM 2003, 8 pages.
The Hyperwords Company, "The Hyperwords Project," located at http://www.hyperwords.net, retrieved on Jan. 15, 2007, copyright 2005/2006, 1 page.
International Searching Authority, "Notification of Transmittal of the International Search Report and the Written Opinion of the International Searching Authority, or the Declaration," international application No. PCT/US06/39028, (6 pages).
Claims, international application No. PCT/US06/39028 (5 pages).
ISA/US Patent Cooperation Treaty, PCT "Notification of Transmittal of the International Search Report and the Written Opinion of the International Searching Authority, or the Declaration," PCT/US05/26184 dated Jul. 31, 2007 (pp. 1-9).
Current Claims for International Application No. PCT/US05/26184, pp. 1-8.
Korean Intellectual Property Office, "International Search Report," International application No. PCT/US2007/081421, dated Mar. 27, 2008, 13 pages.
Claims, International application No. PCT/US2007/081421, 4 pages.
Lieberman, H.: "Letizia: An Agent That Assists Web Browsing," *Proceedings of the Fourteenth International Joint Conference on Artificial Intelligence*. Aug. 20-25, 1995. pp. 924-929.
Maglio, P. et al., "LiveInfo: Adapting web experience by Customization and Annotation," *In Proceedings of the 1$^{st}$ International Conference on Adaptive Hypermedia and Adaptive Web-based Systems*, AH2000, Trento, Italy (2000) 10 pages.
Manifold, "Selection," dated Dec. 24, 2003, 37 pages.
Mitra, M. et al., Improving Automatic Query Expansion Proceedings of AMC SIGIR, ACM Press 1998. pp. 206-214.
Parker, P., "AOL, PBS Forge Online, On-air Alliance," Click Z Network, Solutions for Marketers, Jan. 10, 2000, located on the internet at < http://www.clickz.com/news/article.php/12 278621>, retrieved on Dec. 14, 2005 (4 pages).
Rhodes, B. et al., "Remembrance Agent: A continuously running automated information retrieval system" *Proceedings of the First International Conference on the Practical Application of Intelligent Agents and Multi Agent Technology* (PAAM 1996) pp. 487-495.
Serif, "PhotoPlus 6.0 Companion," Software Publishing Corporation, 1999, 10 pages.
Sugiyama, K. et al., "Adaptive Web Search Based on User Profile Constructed without Any Effort from Users," XP-002434325, International World Wide Web Conference, May 2004 (10 pages).
D2: Sugiyama, K. et al., "Adaptive Web Search Based on User Profile Constructed without Any Effort from Users" WWW2004, May 17-22, 2004 (12 pages).
Vibrant Media, "intelliTXT Words Engage," located at http://www.intellitxt.com, retrieved on Jan. 15, 2007, copyright 2006, 1 page.
Yahoo!, "Yahoo!Search, Y!Q Beta, Search in Context," Yahoo! Inc., 2005, located on the Internet at < http://yq.search.yahoo.com/publisher/faq.html>, retrieved on Dec. 14, 2005 (10 pages).
Zhao, H. et al., "Fully Automatic Wrapper Generation for Search Engines," International World Wide Web Conference, Proceedings of the 14$^{th}$ conference on World wide web, ACM 2005, 10 pages.
U.S. Appl. No. 12/897,642, filed Oct. 4, 2010, Advisory Action, dated Mar. 6, 2014.
U.S. Appl. No. 12/897,642, filed Oct. 4, 2010, Notice of Allowance, dated May 30, 2017.
U.S. Appl. No. 12/897,642, filed Oct. 4, 2010, Final Office Action, dated Dec. 18, 2014.
U.S. Appl. No. 12/897,642, filed Oct. 4, 2010, Office Action, dated Apr. 22, 2016.
U.S. Appl. No. 12/897,642, filed Oct. 4, 2010, Office Action, dated Jun. 10, 2014.
U.S. Appl. No. 12/897,642, filed Oct. 4, 2010, Final Office Action, dated Nov. 2, 2016.
U.S. Appl. No. 12/897,642, filed Oct. 4, 2010, Office Action, dated Apr. 23, 2012.
U.S. Appl. No. 12/897,642, filed Oct. 4, 2010, Final Office Action, dated Oct. 11, 2012.
U.S. Appl. No. 12/897,642, filed Oct. 4, 2010, Office Action, dated Jul. 16, 2013.
U.S. Appl. No. 12/897,642, filed Oct. 4, 2010, Final Office Action, Jan. 17, 2014.

* cited by examiner

SERVER 230
INTERNET
ISP
228
226
LOCAL NETWORK 222
HOST 224
NETWORK LINK
220
200
STORAGE DEVICE 210
ROM 208
MAIN MEMORY 206
BUS 202
COMMUNICATION INTERFACE 218
PROCESSOR 204
DISPLAY 212
INPUT DEVICE 214
CURSOR CONTROL 216

CONTEXTUAL QUICK-PICKS

RELATED APPLICATION DATA AND CLAIM OF PRIORITY

This application is a Continuation of prior U.S. patent application Ser. No. 12/897,642 entitled "Contextual Quick-Picks", filed Oct. 4, 2010, the contents of which are incorporated by reference for all purposes as if fully set forth herein.

FIELD OF THE INVENTION

The present invention relates to searches and, more specifically, facilitating searches by presenting to a user one or more quick-picks based on the content being viewed by the user.

BACKGROUND

People often obtain information by using computing devices to submit queries to search engines. The most common form of search query is a keyword query. A keyword query is a query formed of one or more keywords, where the keywords generally reflect the subject about which the searcher desires to obtain information. For example, a searcher interested in who invented hydrogen peroxide may submit the keyword query "hydrogen peroxide inventor" to a search engine.

Long keyword search queries can be formulated relatively quickly by users with good typing skills and a full sized keyboard. However, the weaker the typing skills, and the more cumbersome the user input mechanism, the more difficult it becomes to formulate long keyword queries. For example, when using small touch-screen interfaces that are prevalent on handheld devices, formulating a keyword query such as "hydrogen peroxide inventor" may be a painful and error-prone experience.

To facilitate the formulation of keyword queries, some search engines attempt to guess at what the finished query while the user is still typing the query. For example, if the user has entered the letters "hydrog" the search engine may suggest the query "hydrogen". If the search engine correctly guesses the query that the user is in the process of typing, then the user may simply select the query suggestion to cause the selected query to be submitted to the search engine.

While suggested queries can significantly reduce the amount of user input required to formulate a query, suggested queries only do so when the search engine accurately guesses the user's intent. Typically, the only clue to the user's intent is the partially-formulated query that the user has typed in thus far. In many cases, the partially-formulated query is insufficient to accurately guess the search intent of the user. For example, based on "hydrog" the search engine may suggest "hydrogen". As the user types in more characters (e.g. "hydrogen p"), the search engine may even suggest "hydrogen peroxide". However, it is highly unlikely that the search engine will suggest "hydrogen peroxide inventor" until the user has typed in nearly the entire query (e.g. "hydrogen peroxide inv").

Based on the foregoing, it is clearly desirable to facilitate searches by reducing the number of input actions required to formulate a search query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for facilitating the formulation of queries by providing "quick-picks" to the user based, at least in part, on the context in which the query is being formulated. Quick-picks are items that, when selected, add search criteria items to a query that is being formed. For example, a user may be presented with (a) a search box for entering keywords for a search, and (b) a plurality of quick-picks in the form of selectable words. When the user selects one of the selectable words, the selected word is inserted into the search box. The user may then select more of the selectable words, or type in additional words. When the contents of the search box reflects the search query desired by the user, the user selects a control to initiate a search based on the search criteria items specified in the search box.

According to one embodiment, the quick picks that are presented to the user are selected based on the context in which the search is being performed. For example, in an embodiment where a device is displaying a web page at the time the user starts to formulate a search query using the device, the contents (both textual and non-textual) of that web page may be used as a basis for selecting quick-picks to present to the user. For the purpose of explanation, a web page that is being displayed at the time a user formulates a search query is referred to herein as an "of-interest" page.

For example, if an of-interest page contains the names of several chemicals, those chemical names can be selected to be the quick-picks that are presented to the user when the user begins formulating a search query. In addition to words that appear on the of-interest page, the quick-picks may be derived based on non-textual content of the of-interest page, such as images, video files and audio files.

When a user is already viewing a page that relates to particular content, it is likely that any search the user initiates while on that page will relate to that content. Consequently, quick-picks that are derived from the content of of-interest pages are likely to reflect the user's search intent. In situations where the quick-picks do reflect the user's search intent, the selection of those quick picks to formulate a query significantly reduces the amount of input actions the user has to perform prior to submitting the desired query.

System Overview

Figure 1:
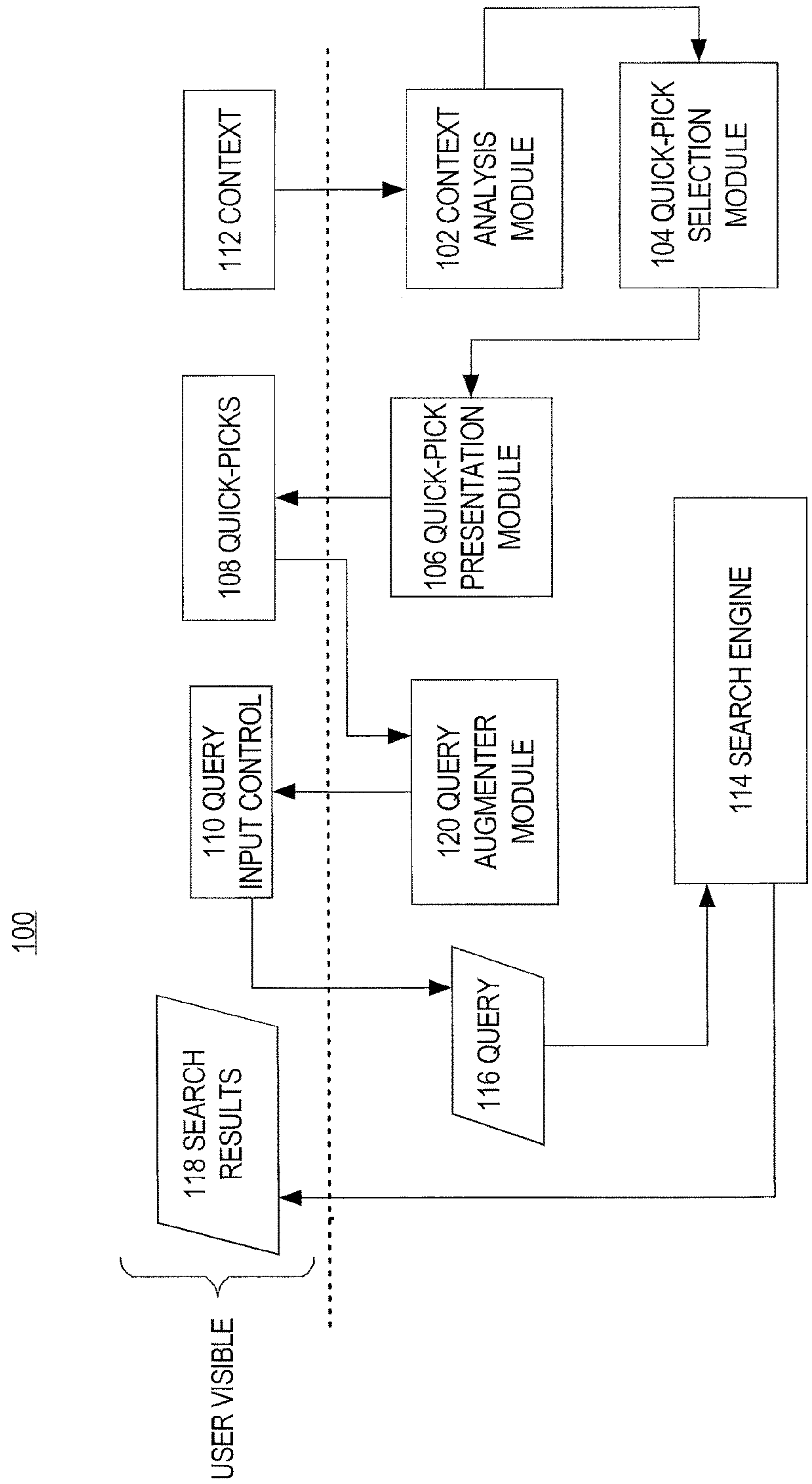
FIG. 1 is a block diagram of a system for selecting context-derived quick-picks, according to an embodiment of the invention.

Referring to FIG. 1, it is a block diagram of a system 100 for selecting context-derived quick-picks according to an embodiment of the invention. System 100 includes several items that are visible on the display of a local computing device that is being used to formulate a search query. In addition, system 100 includes several modules that, while not directly viewable on the local computing device, participate in generation of the viewable items. Those modules may be executing on the local computing device, or may be executing on computing devices that are remote to the local computing device. Typically, the local computing device would be communicatively coupled to those remote computing devices via one or more networks.

In the embodiment illustrated in FIG. 1, the query is being formulated on the local computing device through the use of a query input control 110. Query input control 110 may be, for example, a text box into which a user may type search terms. The mechanism by which the user types characters into query input control 110 will vary based on the nature of the local computing device. For example, if the local computing device is a desktop computer system, then a user may be able to type characters into query input control 110 using a conventional keyboard. On the other hand, if the local computing device is a handheld device, such as a personal digital assistant or cell phone, then a user may need to use a miniature keyboard, a touch screen, a phone keypad, or some other mechanism to enter the characters into query input control 110.

System 100 includes a context-analysis module 102 configured to analyze the context 112 in which a query is being formulated. Context 112 generally represents any information about the state of the local computing device, including but not limited to the content that is currently being displayed by the device, and the identity of the user that is currently using the device.

Based on the analysis of the context 112 that is performed by context analysis module 102, a quick-pick selection module 104 selects which quick-picks 108 should be presented to the user of the local device. Quick-pick presentation module 106 presents to the user the quick-picks that were selected by quick-pick selection module 104.

System 100 also includes a query augmenter module 120. Query augmenter module 108 is configured to add search criteria items into the query input control 110 in response to detecting that a user has selected one of the quick-picks. Each time a user selects a quick-pick from the presented quick-picks 108, query augmenter module 120 adds a search criteria item that corresponds to the quick-pick to the query that is being constructed using the query input control 110.

When a user is satisfied with the query represented in the query input control 110, the user activates a control to submit the query 116 to a search engine 114. The search engine 114, in turn, identifies search results 118 based on the search criteria items within the submitted query 116, and causes the search results 118 to be presented on the local device.

Quick-Pick Display Triggers

As mentioned above, quick-pick presentation module 106 displays quick picks 108 to assist a user that is formulating a query. According to one embodiment, the display of the quick-picks 108 is triggered when it is detected that a user has initiated formulation of a search query. Detecting that a user has initiated formulation of a search query may be accomplished in many ways, and the techniques described herein are not limited to any particular manner of detecting that a user has initiated formulation of a search query.

For example, a user may perform some action that explicitly indicates an intent to begin formulating a search query. For example, the user may push a button that causes display of a search box for entering search terms. Alternatively, a user may perform an action that implicitly indicates an intent to begin formulating a search query. For example, the user may simply move the input focus over the portion of the screen that displays the search box.

In embodiments that display of the quick-picks 108 in response to detecting that a user has initiated formulation of a query, the context analysis performed by context analysis module 102, and the quick-pick selection performed by quick-pick selection module 104, may also be performed in response to detecting the formation of the query. In such an embodiment, detecting that a user has initiated formation of a query would trigger the following actions in order: analysis of the context, selection of the quick-picks, display of the selected quick-picks. However, in alternate embodiments, either the context analysis, or both the context analysis and the quick-pick selection, can be performed proactively prior to detecting that the user is formulating a query. Performing the context analysis proactively prior to detecting the formulation of a query has the benefit of reducing the latency between query initiation and quick-pick display. However, proactive analysis of content also incurs overhead which may be wasted if the user does not actually formulate a query while within the context that was analyzed.

Rather than present quick-picks in response to detecting that a user is starting to formulate a query, quick-picks can be presented in response to user input that requests display of quick-picks. For example, query input control 110 may include a text box into which a user can manually type input terms without automatically triggering display of any quick-picks. In such an embodiment, query input control 110 may be accompanied by a quick-picks button which, when selected, causes the display of quick-picks. In such an embodiment, the user may opt to see quick picks at the start of the query formulation process or after the query has already been partially formed.

EXAMPLE

From-the-Page Textual Quick Picks

As illustrated in FIG. 1, quick-picks 108 are selected for presentation based, at least in part, on the context 112 in which a query 116 is being formulated. According to one embodiment, the query input control 110 is displayed while a user is viewing a web page on a local device, and the content of that of-interest page is treated as the context 112 of the search query. In such an embodiment, quick-pick selection module 104 may be configured to select as quick-picks all words, within the of-interest page, that satisfy certain criteria. For example, quick-pick selection module 104 may be configured to pick as quick-picks those words, within the web page, that identify people, places or things.

For the purpose of explanation, assume that query input control 110 is on a device that is currently displaying a web page about dinosaurs. That web page may contain the names of twenty dinosaurs, and a discussion of the Jurassic and Triassic Periods. Under these circumstances, quick-pick selection module 104 may select as quick-picks the names of each of the twenty dinosaurs, as well as the phrases "Jurassic Period" and "Triassic Period".

After a set of words from the web page have been selected as the quick-picks, quick pick presentation module 106 presents an interface, on the local device, by which the quick-picks may be selected by a user. The actual interface generated by the quick-pick presentation module 106 to allow selection of the quick-picks may vary from implementation to implementation. For example, in one embodiment, quick-pick presentation module 106 merely causes the words that were selected to be quick-picks to be highlighted within the web page that is already being displayed. Alternatively, quick-pick presentation module 106 may generate a separate quick-pick list from which a user may select one or more quick-picks 108.

In response to a user selecting a quick-pick, a search-criteria item is added to the query that is being formulated. In the case where the selected quick-pick is a textual word or phrase, the search-criteria item that is added to the query will typically be the textual word or phrase itself. For example, selecting the quick-pick "Jurassic Period" will typically add the text "Jurassic Period" to the query input control 110 as if the user had actually typed that text.

According to one embodiment, selection of a quick-pick does not trigger the submission of the query 116 to the search engine 114. Rather, the user is free to enter additional search criteria items to the query input control 110, either by selecting additional quick-picks 108 or by typing in more search terms using whatever character entry input mechanism the local device supports. For example, the query 116 may ultimately be "Jurassic Period weather", where "Jurassic Period" is automatically added to the query 116 in response to selection of the "Jurassic Period" quick-pick, and "weather" was manually typed into the query input control 110 by the user.

Textual Quick-Picks from Non-Textual Context

In the example given above, the quick-picks are words that are selected from the textual content of an of-interest page that is being displayed on a local device at the time the query is being formulated. However, according to an embodiment of the invention, textual quick-picks may also be derived based on non-textual content of of-interest pages.

For example, assume that the local device is displaying a digital image at the time the user starts to formulate a search query. In some cases, that digital image may have been produced by scanning a document. Therefore context analysis module 102 may attempt to convert the digital image to text by sending the digital image to an optical character recognition (OCR) module. If the OCR module is able to produce meaningful text from the digital image, then the resulting text may be provided to quick-pick selection module 104, from which the quick-pick selection module 104 may select one or more quick-picks. This is merely one example of a situation in which the quick-picks may include words and/or phrases that are not actually within the text of the web page being displayed, but which are selected to be quick-picks based on non-textual content within the web page.

As another example, an of-interest page may contain media items such as video and/or audio files. According to one embodiment, quick-picks are based on metadata about the media items. For example, when an of-interest page includes or refers to an audio file containing a song, the name of the artist of the song (which may or may not be listed in the text of the of-interest page itself) may be extracted from the audio file. Based on the extracted metadata, the name of the artist may be presented to the user as a quick-pick.

As yet another example, an of-interest may page may contain a link (which may or may not be visible) to another page. According to one embodiment, the contents of the page to which the link points may also be used as the basis from which to derive quick picks. For example, a user may be looking at a page that relates to volcanoes that has a link to another page about Mount St. Helens. Even though the of-interest page does not itself include the phrase "Mount St. Helens", quick-pick selection module 104 may elect to use "Mount St. Helens" as a quick pick based on the fact that "Mount St. Helens" is the topic of a page to which the of-interest page is linked.

Context Analysis Module

As mentioned above, context analysis module 102 is responsible for providing information about the context in which the user is formulating a search to quick-pick selection module 104, so that quick-pick selection module 104 may select quick-picks based on that context. In the case where quick-picks are simply words and phrases from an of-interest page, context analysis module 102 may simply parse the page to identify relevant sections. Quick-pick selection module 104 may then select which words or phrases to use as quick-picks based, at least on part, on the section in which a word or phrase is found. For example, quick-pick selection module 104 may select as quick-picks all words and/or phrases from the "title" section of the of-interest web page, and words or phrases and/or phrases that occur most frequently in the "body" section of the of-interest page.

In addition to parsing the text of an of-interest page, context analysis module 102 may be designed to perform more sophisticated analysis operations. For example, context analysis module 102 may cause images to be converted to text using OCR. As another example, context analysis module 102 may follow links that are in an of-interest page to other pages, and parse those other pages to identify keywords. Context analysis module 102 may also extract metadata, such as artist and title, out of non-textual media items such as audio recordings.

Context analysis module 102 may also include logic to handle specific contexts. For example, a user may initiate formulation of a search query while playing a game of chess. In such a scenario, context analysis module 102 may inspect the current position of the chess pieces on the chess board. The current piece positions may be used as look-up criteria to identify information such as (a) the name of the strategy (e.g. King's Gambit, Guatemala Defense, etc.) that best matches the current position, (b) the names of famous games in which the current position was achieved, (c) the names of famous chess players that played those games, etc. Once this information is obtained by context analysis module 102, quick-pick selection module 104 may select those names as quick-picks, which are then presented to the user by quick-pick presentation module 106.

In an online shopping environment, the context analysis module 102 may determine what type of product the user is currently viewing, and determine the names of similar or related products. For example, if at the time a user initiates formulating a search query, the user is viewing a page related to a particular printer, context analysis module 102 may determine the type of printer that is being viewed, and determine the names of (a) similar printers and (b) printer supplies used by the printer. Even though the names themselves are not present on the page that is being viewed, context analysis module 102 may determine those names from other sources. For example, context analysis module 102 may determine those names using a related-product index maintained by a service that is accessible to the context analysis module 102.

The chess and shopping examples given above are merely examples of contexts in which context analysis module 102 may perform sophisticated operations to determine, based on the context in which the user initiated a search, which words and phrases the user may want to include as keywords in the search. The techniques described herein are not limited to any particular context nor context analysis operation. The context in which a search is initiated may include, for example, what is currently displayed in a browser on the local device, what is currently displayed in a non-browser application (e.g. a game) on the local device, a song or video that is currently being played by the local device, etc.

Quick-Pick Presentation Module

Quick-pick presentation module 106 is responsible for presenting to a user those quick picks 108 that were selected by quick-pick selection module 104. The manner of presenting quick-picks to a user may vary from implementation to implementation. For example, in an embodiment where the quick-picks are selected from content that is currently being displayed on the local device, quick-pick presentation module 106 may simply highlight the quick-picks within that content. For example, if an of-interest page is being displayed on the local device, words within that of-interest page may be highlighted in a manner that indicates that the words are quick-picks for formulating the search query. Any highlight technique that visually distinguishes quick-picks from words that are not quick-picks may be used. For example, the quick-picks may be bolded, enlarged, italicized, colored, boxed, starred, etc.

In one embodiment, all of the content of an of-interest page is selectable as a quick-pick in response to the user initiating formulation of a query. Under these circumstances, quick-pick presentation module 106 may be configured to only highlight those words which are actually selected by the user, in response to the words being selected. In an alternative embodiment, quick-pick presentation module 106 may highlight those words and phrases that are most likely to be of interest to the user, even though all of the words and phrases are selectable as quick-picks. For example, quick-pick presentation module 106 may “dim” all of the content of the of-interest page except for proper nouns on the page. However, the user may select both the highlighted and non-highlighted words. In response to any word or phrase being selected as a quick-pick, a corresponding search criteria item is added to the query that is being formulated.

In embodiments in which some or all of the quick-picks are not from the currently displayed content, quick-pick presentation module 106 may generate a pop-up panel that lists the quick-picks, or provide a pull-down menu that lists the quick picks. These are merely two examples of controls for displaying quick-picks in a manner that allows user’s to easily select the quick-picks to formulate a search query. The present techniques are not limited to any particular type of graphical user interface control for displaying selectable quick-picks.

Selection of a Quick Pick

As mentioned above, query augmenter module 120 adds a search criteria item to a being-formed search query in response to a user selecting a quick pick. How a quick-pick is selected by a user may vary from implementation to implementation, depending on the nature of the local device. For example, if the local device is a desktop computer, the current input focus may be controlled by a mouse, track-ball, or track pad. In such an embodiment, a user may select a quick-pick by moving the input focus over the quick-pick and pressing a physical button. On the other hand, if the local device uses a touch screen, the current input focus may be controlled by touching a finger to the screen of the local device. In such an embodiment, a user may select a quick-pick by touching the portion of the screen on which the quick-pick is being displayed.

Moving an input focus (by whatever means) over a quick-pick, and then performing some action to select the quick-pick, is merely one example of how a quick-pick may be selected. As long as the quick-pick selection process is easier than it would have been for the user to manually enter the search criteria item that is represented by the quick pick, the query formulation process has been improved through the use of context-derived quick-picks.

In addition to reducing the input actions required to enter search criteria into the query input control 110, selection of quick-picks also avoids other types of problems associated with manually typed queries, such as spelling errors or failure to recall relevant search terms. For example, a chess-player may recognize that a current board position corresponds to a particular defense strategy, but may not recall the name of that defense strategy. By automatically determining the name of the strategy based on the current position of the pieces in the game, and then presenting the name of that defense strategy to user as a quick pick, the searcher is able to formulate a search query about the strategy without having to remember the name of the strategy.

Augmenting the Query

When a user selects a quick pick, a search criteria item is added to the query that is being formulated. In the context of textual keyword searches, the quick-picks may take the form of textual words and phrases, and the corresponding search criteria items are those same words and phrases. For example, upon selecting the quick pick “King’s Gambit”, the phrase “King’s Gambit” may be added to the query string that is being formulated. However, in alternative embodiments, the quick pick and/or search criteria items may be non-textual.

For example, in one embodiment one or more of the quick-picks that are presented to the user may be images from a page that is currently being displayed by the local device. In response to selection of one of the images, terms relating to the image may be added to the query that is being formulated. For example, in response to selection of an image that portrays a bee, the word “bee” may be added to the search query. As another example, when the user is viewing a page related to a national monument, the user may be presented with quick-picks in the form of images of several other national monuments. In response to user selection of one of those images, the name of the nation monument that is depicted in the selected picture may be added to the search query.

Instead of or in addition to supporting non-textual quick picks, non-textual search criteria items may also be supported. For example, if a user is searching for images related to a particular image, the particular image may be used as a search criteria item. As another example, if a user is searching for pages about a band, an image of the band or a recording of one of the songs of the band may be used as search criteria items.

In one embodiment, textual and non-textual search criteria items may be combined to create a search query. For example, assume that a user is formulating a search query to find images of the user's favorite band. If the user is currently viewing a page about the band, the user may be presented with quick picks that include audio recordings of songs sung by the band, images of the band, and/or textual quick-picks related to the band (e.g. the name of the band). The user may select one or more of the quick-picks to formulate a query that contains both textual and non-textual components. When the user ultimately submits the search query, each of the components will affect what items are returned as search results.

Deselection of a Quick-Pick

According to one embodiment, the quick-picks are presented in a manner that allows both selection and deselection of quick-picks. For example, in an embodiment in which a quick-pick is selected by touching the portion of a touch screen that displays the quick-pick, the same quick-pick can be de-selected by touching that portion of the touch screen a second time. In response to de-selection of a quick-pick, the search criteria item that was added to the query is removed from the query. For example, if touching the phrase "hydrogen peroxide" added the words "hydrogen peroxide" to the query that is being formulated, touching that same phrase again will remove the words "hydrogen peroxide" from the query.

Being able to remove a search criteria item from a query in the same simple manner in which the search criteria item was added to the query is particularly helpful on interfaces in which user input errors are common. For example, if the local device on which the query is being constructed has a very small screen and the user have big fingers, it can be expected that the user will periodically select a quick-pick that the user does not intent to select. By allowing easy de-selection of quick-picks, (e.g. with a single user-input action rather than having to erase each character individually) the consequences of such errors can be mitigated.

The Search Environment

Searches are initiated in a variety of environments. In one common search environment, searches are initiated using controls that are associated with a web browser. Such search-initiating controls may be part of the actual browser program, or may be provided by a toolbar or other plug-in. Alternatively, the search-initiating controls may be provided by a computer program that executes independently from a browser.

While a browser is often involved in search-related operations, searches are not limited to computing environments that involve browsers. For example, a search box may be implemented within a locally-installed application, such as a chess game or an e-book reader. Similar to the browser embodiment, the search mechanism used by such applications may be hard-coded into the applications, dynamically linked with such applications (e.g. a plug-in), or executed separate from the applications. The techniques described herein may be used without regard to the specific environment, so long as quick-picks are presented to a user based, at least in part, on the context in which the search query formulation was initiated.

As mentioned above, the techniques described herein are particularly helpful in environments where the entry of long words and phrases is cumbersome. For example, a television set or set-top box may provide a search mechanism, where entry of search terms must be done using the television's remote control. In such an environment, formulating search queries could become much easier using a mechanism that presents to the user intelligently-selected quick-picks (e.g. the name of the movie, actors and/or director of the show currently playing, or the actors and/or automobile models that are currently on-screen).

Sequential Presentation of Quick-Picks

In some situations, a display may not be sufficiently large to show all possible quick-picks associated with a given context. In such a situation, a user is initially presented with a sub-set of the quick-picks. In response to user selection of one of the quick-picks in the first set, the quick-picks that are presented to the user change. Preferably, the second set of quick-picks that are presented to the user are selected based, at least in part, on the quick-pick that was selected from the initial set. For example, assume that a user initiates formulation of a search query while watching a movie that includes actors A and B, and that was directed by director C. Under these circumstances, the initial set of quick-picks may include the names of the actors, the name of the director, and the name of the movie. If the user selects the name of actor A from the initial set of quick-picks, the user may be presented with a second set of quick-picks that includes other movies with actor A. On the other hand, if the user had selected the name of director C, the user may have been presented with the names of other movies directed by director C.

In addition to new quick-picks that are related to the selected quick-pick, the second set of quick-picks may include some or all of the quick-picks that were initially presented, or may be an entirely different set of quick-picks. The process of redisplaying new sets of quick-picks based on user-selected quick-picks may be repeated any number of iterations, until the user has completed formulation of the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
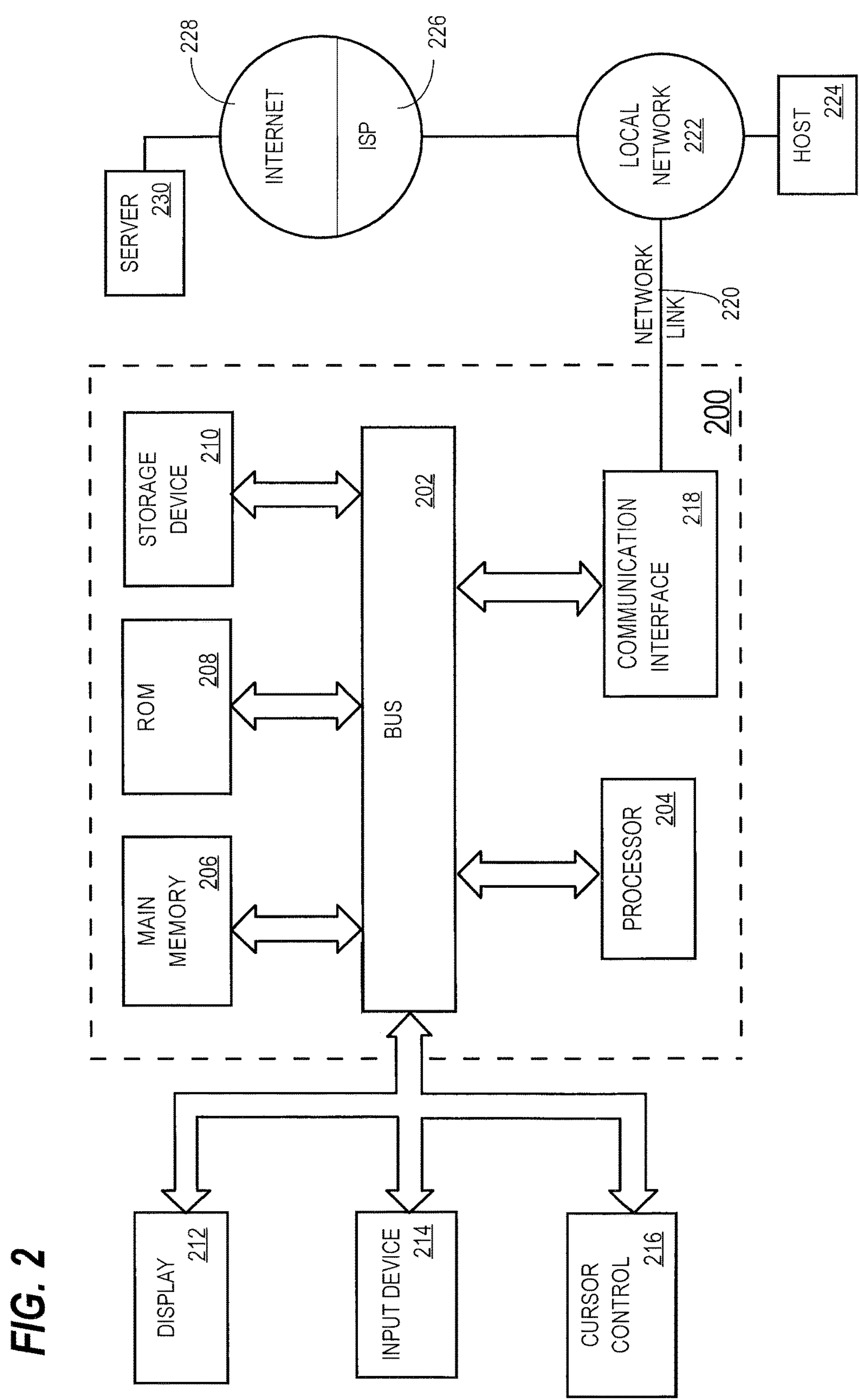
FIG. 2 is a block diagram of a computer system upon which embodiments of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:

at a local device, while a search query is being formulated by a user in a search box displayed at the local device, automatically displaying, separate from the search query, a set of one or more selected quick-picks, wherein the set of one or more selected quick-picks includes one or more images and is selected based, at least in part, on a current context associated with displayed content in one or more applications executing on the local device;

receiving, at the local device, user input that selects a particular image from the one or more images;

in response to receiving, at the local device, the user input that selects the particular image from the one or more images, adding as one or more separate terms to the search query in the search box displayed at the local device, one or more search terms that correspond to the particular image selected by the user, and allowing the search query, including the one or more separate terms that correspond to the particular image selected by the user, to continue to be formulated by the user in the search box displayed at the local device prior to the search query being submitted for processing;

receiving, at the local device, additional user input that deselects the particular image from the set of one or more selected quick-picks; and in response to receiving, at the local device, the additional user input that deselects the particular image, automatically removing, from the search query being formulated by the user in the search box displayed at the local device, the one or more search terms that correspond to the particular image, and allowing the search query to continue to be formulated by the user in the search box displayed at the local device prior to the search query being submitted for processing;

wherein the method is performed by one or more computing devices.

2. The method of claim 1, further comprising:

displaying a second set of one or more quick-picks in response to the user input that selects the particular image from the one or more images included in the set of one or more selected quick-picks, wherein the second set of one or more quick-picks includes at least one additional image that:

(a) was not in the one or more images, and (b) was selected to be a quick-pick based, at least in part on an association between the at least one additional image and the particular image selected by the user.

3. The method of claim 1, wherein:

the displayed content on the local device when formulation of the search query was initiated includes an of-interest page; and the set of one or more selected quick-picks is selected based, at least in part, on content of the of-interest page.

4. The method of claim 3, further comprising adding to the search query a word or a phrase that was not present on the of-interest page.

5. The method of claim 1, wherein the set of one or more selected quick-picks includes at least one quick pick that is selected to be a quick-pick based, at least in part, on a non-textual item that is part of the current context associated with the one or more applications executing on the local device, wherein the non-textual item is one or more of: a digital image, a video, or an audio recording.

6. The method of claim 5, wherein:

the non-textual item is the digital image; and the set of one or more selected quick-picks includes at least one quick-pick that is based on text produced by performing optical character recognition on the digital image.

7. The method of claim 1, wherein the one or more search terms that correspond to the particular image selected by the user are one or more text-based search terms.

8. One or more non-transitory storage media storing instructions which, when processed by one or more processors, cause:

at a local device, while a search query is being formulated by a user in a search box displayed at the local device, automatically displaying, separate from the search query, a set of one or more selected quick-picks, wherein the set of one or more selected quick-picks includes one or more images and is selected based, at least in part, on a current context associated with displayed content in one or more applications executing on the local device;

receiving, at the local device, user input that selects a particular image from the one or more images;

in response to receiving, at the local device, the user input that selects the particular image from the one or more images, adding as one or more separate terms to the search query in the search box displayed at the local device, one or more search terms that correspond to the particular image selected by the user, and allowing the search query, including the one or more separate terms that correspond to the particular image selected by the user, to continue to be formulated by the user in the search box displayed at the local device prior to the search query being submitted for processing;

receiving, at the local device, additional user input that deselects the particular image from the set of one or more selected quick-picks; and in response to receiving, at the local device, the additional user input that deselects the particular image, automatically removing, from the search query being formulated by the user in the search box displayed at the local device, the one or more search terms that correspond to the particular image, and allowing the search query to continue to be formulated by the user in the search box displayed at the local device prior to the search query being submitted for processing.

9. The one or more non-transitory storage media of claim 8, further comprising additional instructions which, when processed by the one or more processors, cause:

displaying a second set of one or more quick-picks in response to the user input that selects the particular image from the one or more images included in the set of one or more selected quick-picks, wherein the second set of one or more quick-picks includes at least one additional image that:

(a) was not in the one or more images, and (b) was selected to be a quick-pick based, at least in part on an association between the at least one additional image and the particular image selected by the user.

10. The one or more non-transitory storage media of claim 8, wherein:

the displayed content on the local device when formulation of the search query was initiated includes an of-interest page; and the set of one or more selected quick-picks is selected based, at least in part, on content of the of-interest page.

11. The one or more non-transitory storage media of claim 10, further comprising additional instructions which, when processed by the one or more processors, cause adding to the search query a word or a phrase that was not present on the of-interest page.

12. The one or more non-transitory storage media of claim 8, wherein the set of one or more selected quick-picks includes at least one quick pick that is selected to be a quick-pick based, at least in part, on a non-textual item that is part of the current context associated with the one or more applications executing on the local device, wherein the non-textual item is one of: a digital image, a video, or an audio recording.

13. The one or more non-transitory storage media of claim 12, wherein:

the non-textual item is the digital image; and the set of one or more selected quick-picks includes at least one quick-pick that is based on text produced by performing optical character recognition on the digital image.

14. The one or more non-transitory storage media of claim 8, wherein the one or more search terms that correspond to the particular image selected by the user are one or more text-based search terms.

15. An apparatus comprising:

one or more processors, and one or more memories communicatively coupled to the one or more processor and storing instructions which, when processed by one or more processors, cause:

at a local device, while a search query is being formulated by a user in a search box displayed at the local device, automatically displaying, separate from the search query, a set of one or more selected quick-picks, wherein the set of one or more selected quick-picks includes one or more images and is selected based, at least in part, on a current context associated with displayed content in one or more applications executing on the local device;

receiving, at the local device, user input that selects a particular image from the one or more images;

in response to receiving, at the local device, the user input that selects the particular image from the one or more images, adding as one or more separate terms to the search query in the search box displayed at the local device, one or more search terms that correspond to the particular image selected by the user, and allowing the search query, including the one or more separate terms that correspond to the particular image selected by the user, to continue to be formulated by the user in the search box displayed at the local device prior to the search query being submitted for processing;

receiving, at the local device, additional user input that deselects the particular image from the set of one or more selected quick-picks; and in response to receiving, at the local device, the additional user input that deselects the particular image, automatically removing, from the search query being formulated by the user in the search box displayed at the local device, the one or more search terms that correspond to the particular image, and allowing the search query to continue to be formulated by the user in the search box displayed at the local device prior to the search query being submitted for processing.

16. The apparatus of claim 15, wherein the one or more memories store additional instructions which, when processed by one or more processors, cause:

displaying a second set of one or more quick-picks in response to the user input that selects the particular image from the one or more images included in the set of one or more selected quick-picks, wherein the second set of one or more quick-picks includes at least one additional image that:

(a) was not in the one or more images, and (b) was selected to be a quick-pick based, at least in part on an association between the at least one additional image and the particular image selected by the user.

17. The apparatus of method of claim 15, wherein:

the displayed content on the local device when formulation of the search query was initiated includes an of-interest page; and the set of one or more selected quick-picks is selected based, at least in part, on content of the of-interest page.

* * * * *